(12) United States Patent
Prasad

(10) Patent No.: US 8,308,839 B2
(45) Date of Patent: Nov. 13, 2012

(54) KIMBERLITE BASED PLANT NUTRIENT AND PREPARATION THEREOF

(75) Inventor: Durga Yandapalli Prasad, Andhra Pradesh (IN)

(73) Assignee: Bijam Biosciences Private Limited, Punjagutta (IN)

( * ) Notice: Subject to any disclaimer, the term of this patent is extended or adjusted under 35 U.S.C. 154(b) by 0 days.

(21) Appl. No.: 12/939,610

(22) Filed: Nov. 4, 2010

(65) Prior Publication Data

US 2011/0185780 A1 Aug. 4, 2011

(30) Foreign Application Priority Data

Nov. 4, 2009 (IN) .............................. 1026/CHE/2009
Sep. 27, 2010 (IN) .............................. 2844/CHE/2010

(51) Int. Cl.
*C05F 11/02* (2006.01)
*C05C 9/00* (2006.01)

(52) U.S. Cl. ................... 71/24; 71/28; 71/62; 71/903
(58) Field of Classification Search .............. 71/11–63, 71/903

See application file for complete search history.

(56) References Cited

U.S. PATENT DOCUMENTS

| | | | | |
|---|---|---|---|---|
| 1,397,264 | A | * | 11/1921 | Christenson et al. ......... 423/471 |
| 4,067,712 | A | * | 1/1978 | Willard, Sr. ....................... 71/24 |
| 4,067,713 | A | * | 1/1978 | Willard, Sr. ....................... 71/24 |
| 4,067,714 | A | * | 1/1978 | Willard, Sr. ....................... 71/24 |
| 4,067,715 | A | * | 1/1978 | Willard, Sr. ....................... 71/24 |
| 4,084,938 | A | * | 4/1978 | Willard, Sr. ................... 424/125 |
| 4,377,599 | A | * | 3/1983 | Willard, Sr. ................... 426/310 |
| 4,541,857 | A | * | 9/1985 | Snively ............................. 71/24 |
| 5,538,530 | A | * | 7/1996 | Heaton et al. .................... 71/24 |
| 5,603,744 | A | * | 2/1997 | Kurner ............................... 71/9 |
| 7,615,093 | B2 | * | 11/2009 | Pildysh ....................... 71/64.11 |
| 2002/0174697 | A1 | * | 11/2002 | Reid et al. ......................... 71/23 |

OTHER PUBLICATIONS

Jain et al, "Response and economic viability of wheat (*Triticum aestivum*) to kimberlite along with chemical fertilizers and phosphate-solubilizing bacteria", Crop Research, 1997, vol. 14(3), pp. 427-431. (no. month).*

* cited by examiner

*Primary Examiner* — Wayne Langel
(74) *Attorney, Agent, or Firm* — Brinks Hofer Gilson & Lione

(57) ABSTRACT

The present invention relates to provides novel fertilizer products from Kimberlite having utility as nutrients to supply silica, magnesium, trace elements with or without organic substances, and also having scope to design products with various combinations with other fertilizers and/or plant based nutrients with or without nano structure.

14 Claims, 15 Drawing Sheets

| ANGLE | d VALUE | INTENSITY % |
|---|---|---|
| 2-THETA° | ANGSTROM | % |
| 5.332 | 16.56052 | 78.4 |
| 5.979 | 14.77081 | 100.0 |
| 8.797 | 10.04379 | 65.9 |
| 10.774 | 8.20466 | 38.2 |
| 12.082 | 7.31921 | 76.8 |
| 15.180 | 5.83191 | 24.2 |
| 19.316 | 4.59144 | 63.1 |
| 24.421 | 3.64200 | 50.9 |
| 25.284 | 3.51960 | 63.9 |
| 26.680 | 3.33861 | 81.2 |
| 28.445 | 3.13529 | 41.0 |
| 29.446 | 3.03090 | 37.4 |
| 30.928 | 2.88900 | 49.1 |
| 31.932 | 2.80044 | 50.3 |
| 33.090 | 2.70500 | 35.3 |
| 34.481 | 2.59901 | 44.4 |
| 36.328 | 2.47101 | 62.5 |
| 42.422 | 2.12904 | 33.4 |
| 47.978 | 1.89466 | 24.9 |
| 49.292 | 1.84720 | 31.5 |
| 50.114 | 1.81880 | 25.2 |
| 54.066 | 1.69481 | 34.2 |
| 55.006 | 1.66806 | 28.1 |
| 60.149 | 1.53714 | 42.4 |
| 61.749 | 1.50110 | 38.3 |
| 70.102 | 1.34128 | 21.1 |

| ANGLE | d VALUE | INTENSITY % |
|---|---|---|
| 2-THETA° | ANGSTROM | % |
| 8.798 | 10.04248 | 61.7 |
| 12.283 | 7.20029 | 77.1 |
| 19.594 | 4.52705 | 67.8 |
| 25.363 | 3.50878 | 93.5 |
| 26.795 | 3.32451 | 100.0 |
| 28.617 | 3.11677 | 47.9 |
| 29.489 | 3.02656 | 68.9 |
| 34.181 | 2.62112 | 72.3 |
| 37.967 | 2.36799 | 54.7 |
| 40.409 | 2.23034 | 43.0 |
| 48.207 | 1.88621 | 35.5 |
| 54.030 | 1.69587 | 30.9 |
| 56.811 | 1.61927 | 30.2 |
| 60.119 | 1.53784 | 47.6 |
| 61.412 | 1.50852 | 35.1 |
| 68.162 | 1.37465 | 29.1 |
| 71.888 | 1.31227 | 35.6 |

| ANGLE | d VALUE | INTENSITY % |
|---|---|---|
| 2-THETA° | ANGSTROM | % |
| 12.285 | 7.19892 | 55.3 |
| 15.972 | 5.54435 | 33.6 |
| 19.625 | 4.51997 | 57.7 |
| 20.970 | 4.23284 | 55.8 |
| 22.818 | 3.89403 | 54.6 |
| 24.340 | 3.65394 | 67.4 |
| 25.453 | 3.49658 | 86.8 |
| 26.725 | 3.33298 | 100.0 |
| 31.089 | 2.87439 | 45.3 |
| 33.142 | 2.70087 | 53.8 |
| 36.089 | 2.48678 | 61.4 |
| 36.967 | 2.42976 | 53.0 |
| 42.491 | 2.12578 | 38.9 |
| 48.853 | 1.86278 | 29.7 |
| 50.804 | 1.79570 | 23.2 |
| 52.744 | 1.73413 | 36.6 |
| 60.490 | 1.52929 | 44.0 |
| 62.749 | 1.47955 | 26.6 |
| 64.233 | 1.44891 | 22.8 |
| 66.119 | 1.41207 | 22.6 |
| 67.498 | 1.38654 | 23.9 |

| ANGLE | d VALUE | INTENSITY % |
|---|---|---|
| 2-THETA° | ANGSTROM | % |
| 6.831 | 12.92868 | 56.6 |
| 9.277 | 9.52543 | 38.3 |
| 12.270 | 7.20759 | 76.4 |
| 14.284 | 6.19550 | 32.9 |
| 19.482 | 4.55285 | 66.8 |
| 19.865 | 4.46581 | 58.6 |
| 23.203 | 3.83038 | 44.3 |
| 25.336 | 3.51247 | 85.3 |
| 26.720 | 3.33363 | 100.0 |
| 33.097 | 2.70447 | 43.8 |
| 34.079 | 2.62876 | 54.2 |
| 36.047 | 2.48962 | 54.3 |
| 45.518 | 1.99119 | 28.6 |
| 46.633 | 1.94613 | 29.1 |
| 48.170 | 1.88758 | 40.0 |
| 49.535 | 1.83870 | 33.3 |
| 52.772 | 1.73328 | 28.5 |
| 53.780 | 1.70314 | 36.3 |
| 55.146 | 1.66417 | 30.1 |
| 58.094 | 1.58652 | 21.8 |
| 60.132 | 1.53753 | 60.9 |
| 62.730 | 1.47997 | 29.6 |
| 64.569 | 1.44217 | 23.5 |
| 67.804 | 1.38102 | 35.2 |

| ANGLE | d VALUE | INTENSITY % |
|---|---|---|
| 2-THETA° | ANGSTROM | % |
| 6.972 | 12.66868 | 65.8 |
| 8.672 | 10.18807 | 46.7 |
| 11.225 | 7.87629 | 43.2 |
| 12.196 | 7.25135 | 75.7 |
| 19.535 | 4.54059 | 63.6 |
| 20.944 | 4.23812 | 48.8 |
| 23.211 | 3.82914 | 37.7 |
| 25.340 | 3.51200 | 81.9 |
| 26.703 | 3.33570 | 100.0 |
| 30.850 | 2.89616 | 48.7 |
| 31.958 | 2.79818 | 54.3 |
| 34.058 | 2.63029 | 55.3 |
| 35.096 | 2.55489 | 56.7 |
| 41.374 | 2.18051 | 36.2 |
| 45.427 | 1.99496 | 29.7 |
| 46.252 | 1.96128 | 27.6 |
| 55.105 | 1.66530 | 36.8 |
| 60.087 | 1.53858 | 57.2 |
| 72.118 | 1.30866 | 30.3 |

NANO STRUCTURED KIMBERLITE
Figure 15: Scanning Electron Microscopy of Kimberlite Nano Particles ranging from 75 to 250 nanometers

KIMBERLITE BASED PLANT NUTRIENT AND PREPARATION THEREOF

RELATED APPLICATIONS

The present patent document claims the benefit of priority to Indian Patent Application No. 1026/CHE/2009, filed Nov. 4, 2009, and to Indian Patent Application No. 2844/CHE/2010, filed Sep. 27, 2010, the entire contents of each of which are incorporated herein by reference.

FIELD OF THE INVENTION

In general, this invention relates to the field of material sciences. In particular, this invention pertains to production of fertilizers from Kimberlite. This invention also relates to a method of manufacturing fertilizer products from Kimberlite having applications in the field of agriculture. Further, In particular this invention pertains to produce a novel plant nutrient by nano structuring kimberlite. This nano structured kimberlite based plant nutrient is useful to enhance the crop yield significantly.

BACKGROUND AND PRIOR ART OF THE INVENTION

It is known that diamonds are formed when carbon deposits are exposed to high pressure and temperature for prolonged periods. Deep within the earth, there are regions that are at a high enough temperature and pressure that the formation of diamonds is thermo dynamically possible. Under the continental crust, diamonds from starting at depths of about 90 miles where pressure is roughly 5 giga pascals and the temperature is around 2200° Fahrenheit. Diamonds are mined in 'kimberlite pipe'. Kimberlite is an ultra potassic, ultra mafic, igneous rock composed of garnet, olivine, phlogopite, and pyroxene with a variety of other trace minerals. Kimberlite occurs in the earth's crust in vertical structures known as Kimberlite pipes. India is host to the largest known number of Proterozoic Kimberlite clan rocks.

A large amount of Kimberlite is required to produce a carat of diamond. Few tones are required to yield a carat of diamond. Large amount of Kimberlite after removal of diamond is available around the globe without any appropriate utility. Kimberlite contains magnesium, trace metals and silica in rich proportions. Therefore, present invention objective is to invent method of producing Kimberlite based fertilizers Further, it is observed that many plant nutrients were known, however very less attention has been directed to enhance the nutrient absorption capability by nano structuring the plant nutrients. Nano science has found applications in controlling release of nitrogen, zeoponics and using of some materials like zeolite based substrates. With nano fertilizers emerging as alternatives to conventional fertilizers buildup of nutrients in soils and there by eutrophication and drinking water contamination may be eliminated. In fact nano technology has opened up new opportunities to improve nutrient efficiency and minimize costs of environmental protection. It has helped to divulge that plant roots can directly absorb nutrient ions from solid phase of minerals. Present research is further aimed to produce nano structured Kimberlite based plant nutrient that has utility to enhance crop yields. The kimberlite tailings after removal of diamonds were taken in present invention.

OBJECTIVES

Accordingly, the primary object of this invention is to invent fertilizers products from Kimberlite which can be used as fertilizer.

Another object of an embodiment of this invention is to develop production method of Kimberlite based fertilizer products.

Yet another objective of an embodiment of this invention is to invent Kimberlite based products with organic nature.

Still another objective of an embodiment of this invention is to provide a necessary method for production of organic based Kimberlite products.

Yet another objective of an embodiment of the present invention is to provide nano structured kimberlite based plant nutrient to enhance crop yields and method for preparing the same.

SUMMARY

To meet the above objects and others, one embodiment of the present invention provides novel fertilizer products from Kimberlite having utility as nutrients to supply silica, magnesium, trace elements with or without organic substances, and also having scope to design products with various combinations with other fertilizers and/or plant based nutrients. Particularly, another embodiment of the present invention relates to a plant nutrient composition comprising: a first component comprising kimberlite with alkali metal silicate in the ratio of 10:1 to 1:10 w/v; and/or a second component comprising lignite with alkali metal silicate in the ratio of 10:1 to 1:10 w/v; wherein the ratio between the first and the second component is in the range of 10:1 to 1:10 on a weight by weight basis.

BRIEF DESCRIPTION OF FIGURES

FIG. 15 shows the image of Scanning Electron Microscopy of nano structured Kimberlite, wherein Nano Particles ranging from 75 to 250 nanometers

DETAILED DESCRIPTION

Figure 1:
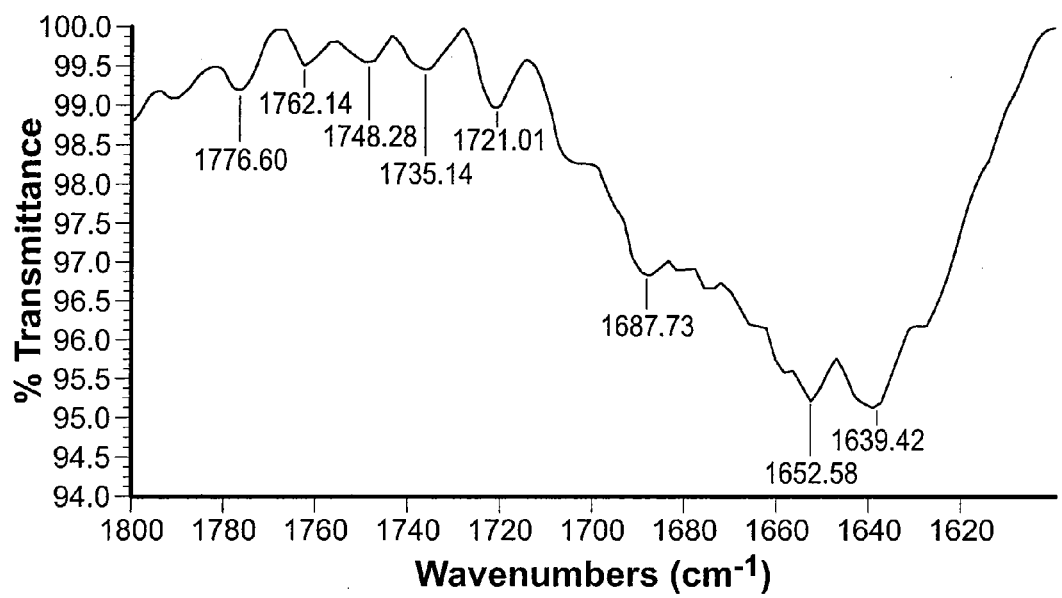
FIG. 1-5 relates to comparative FTIR analysis of Type 1 & 1a: Kimberlite solid (example-10), Type 2 & 2a: 9:3/5% solid (example-4), Type 3 & 3a: 9:3/K—Si solid (example-9), Type 4 & 4a: 9:3 (3 parts are from the alkali extraction from lignite residue), Type 5 & 5a: Kimberlite+K—Si (example-7).
Figure 1A:
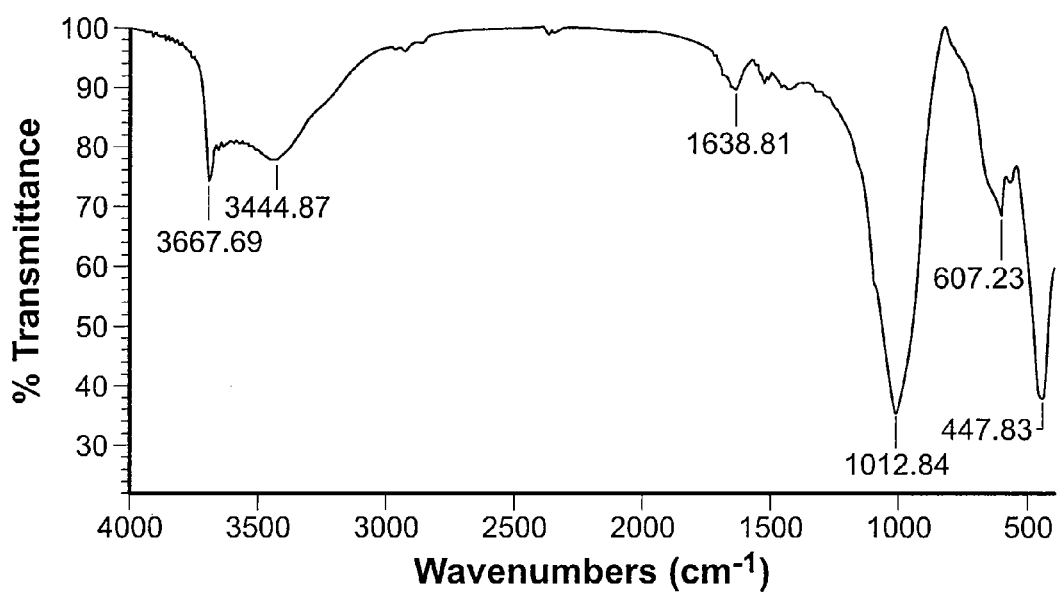
Figure 2:
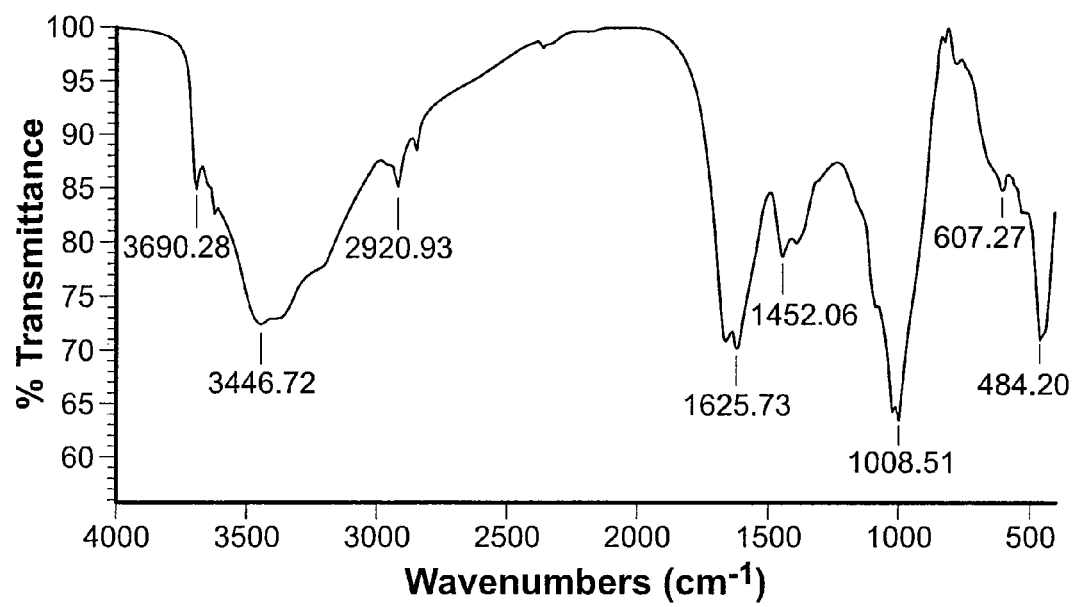
Figure 2A:
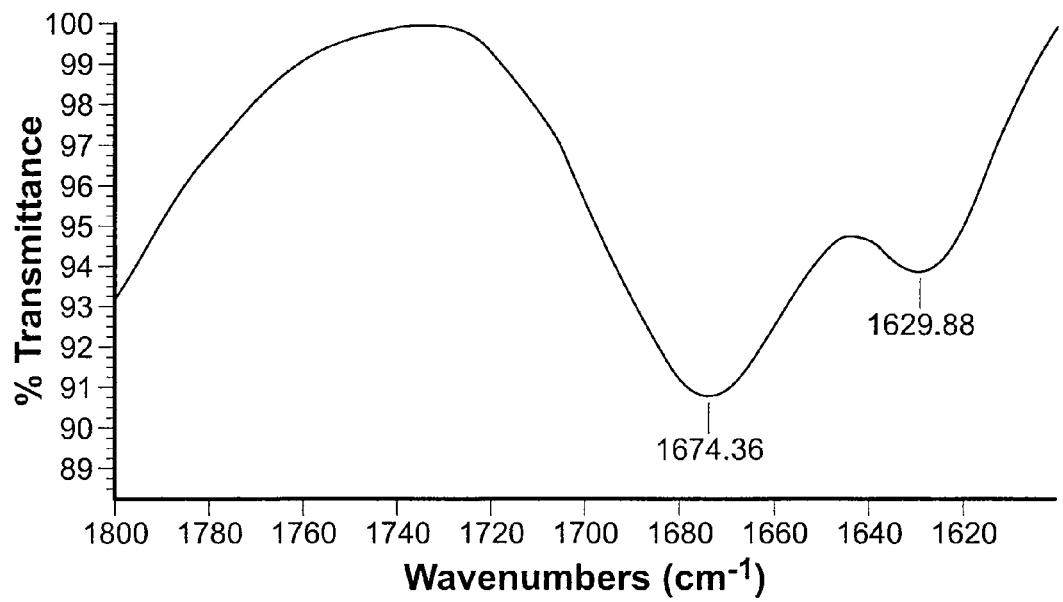
Figure 3:
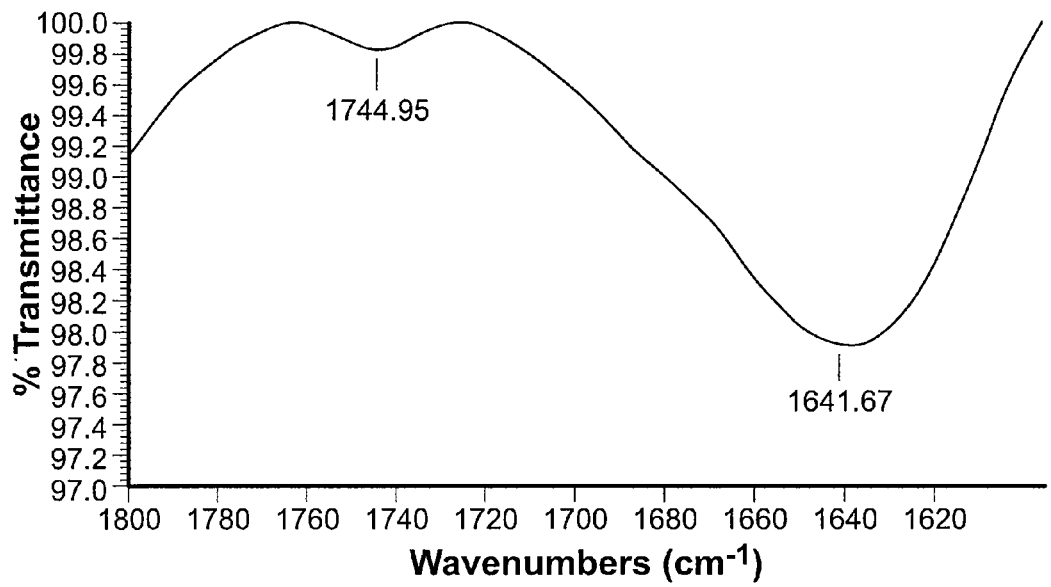
Figure 3A:
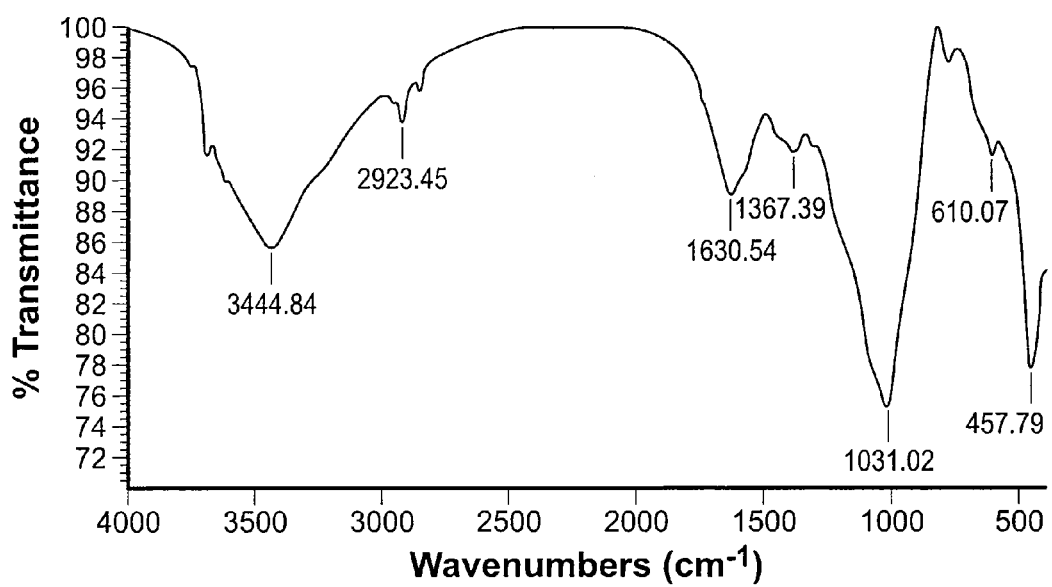
Figure 4:
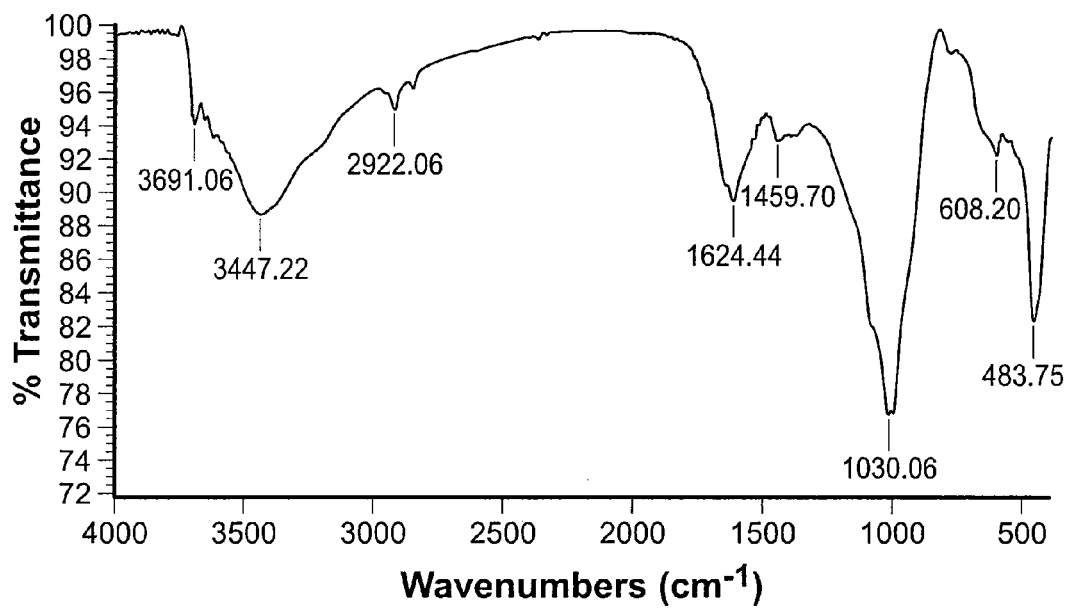
Figure 4A:
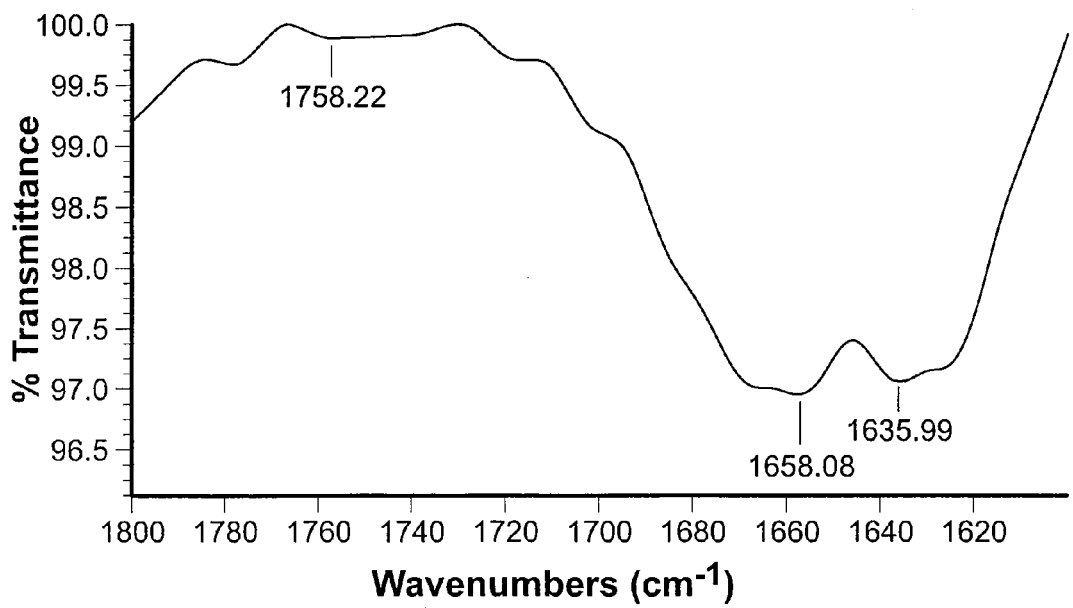
Figure 5:
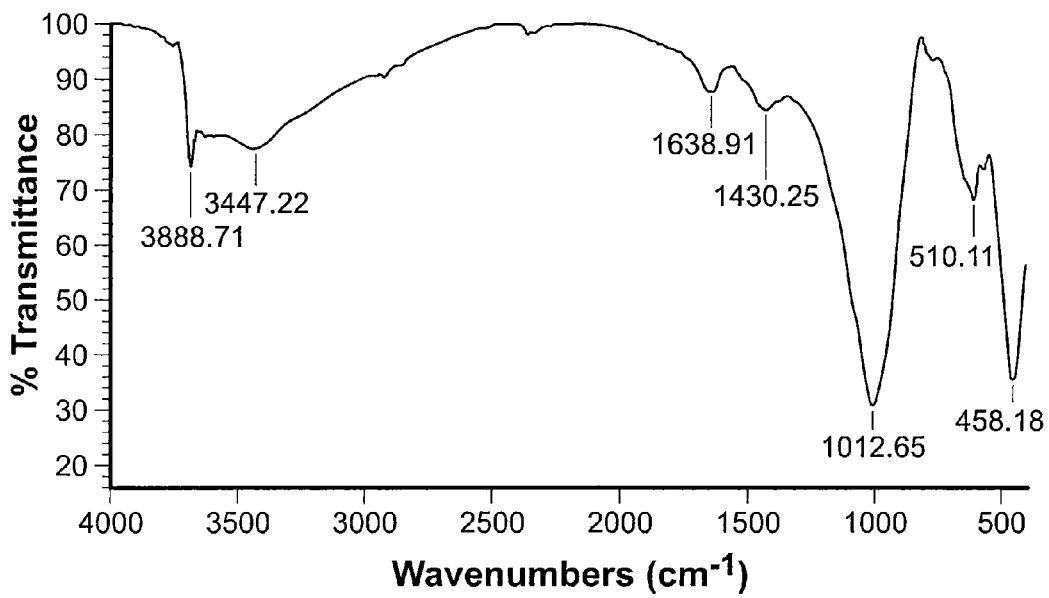
Figure 5A:
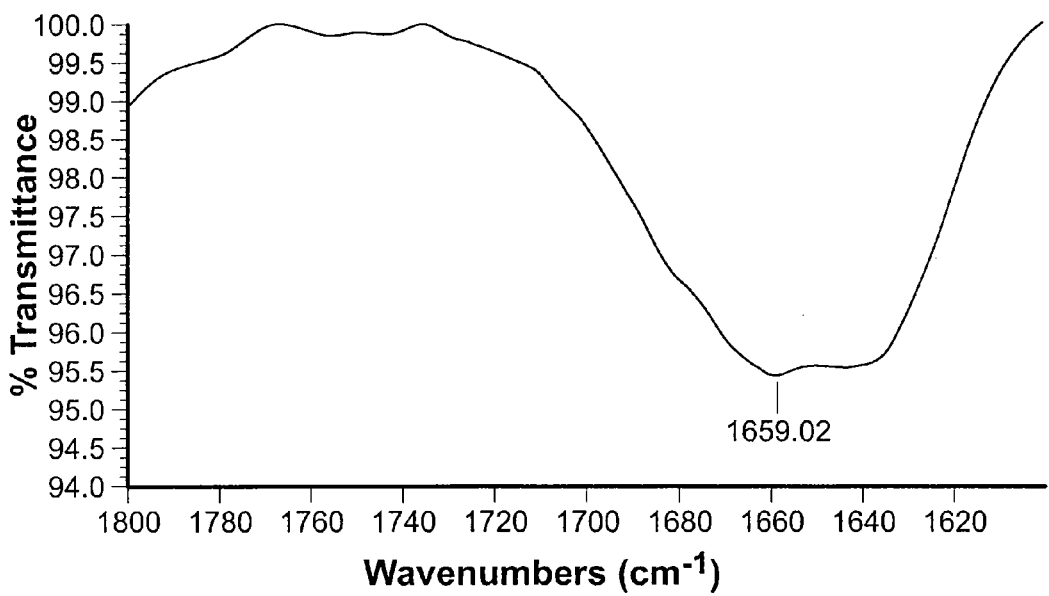
Figure 6:
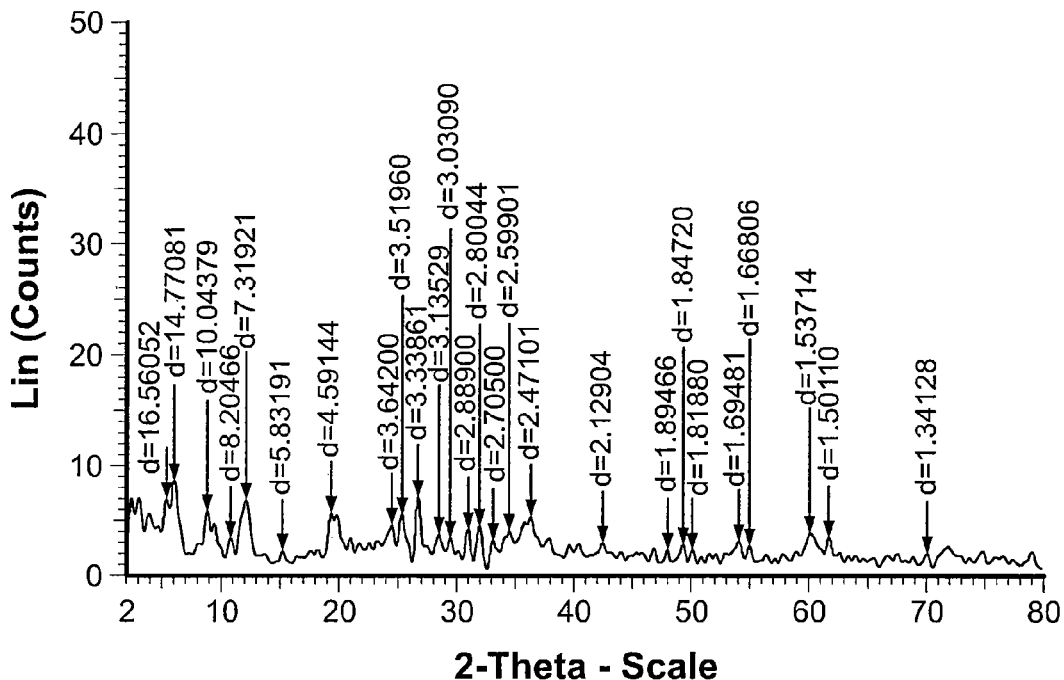
FIG. 6-10 relates to comparative XRD analysis of Type 6: Kimberlite solid (example-10), Type 7: 9:3/5% solid (example-4), Type 8: 9:3/K—Si solid (example-9), Type 9: 9:3 (3 parts are from the alkali extraction from lignite residue), Type 10: Kimberlite+K—Si (example-7).
Figure 7:
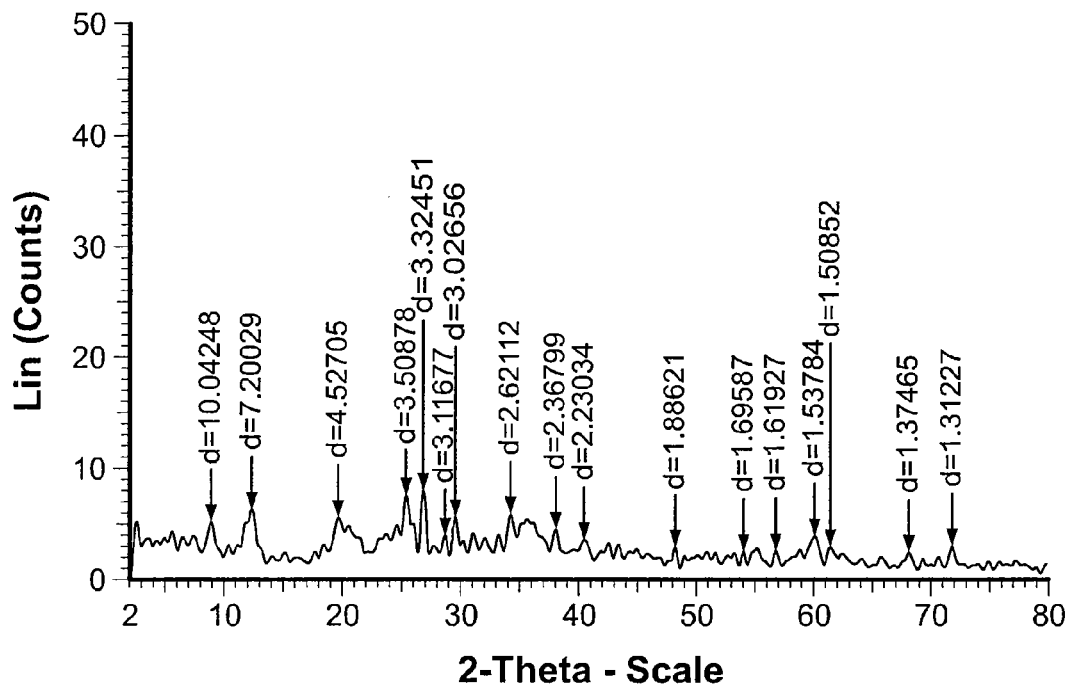
Figure 8:
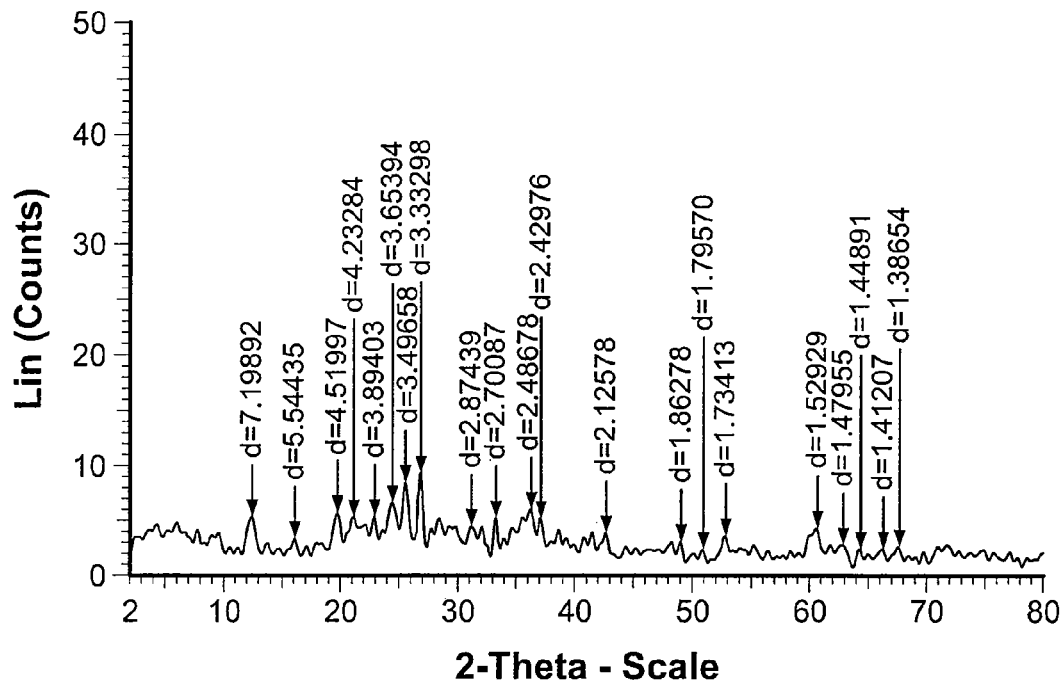
Figure 9:
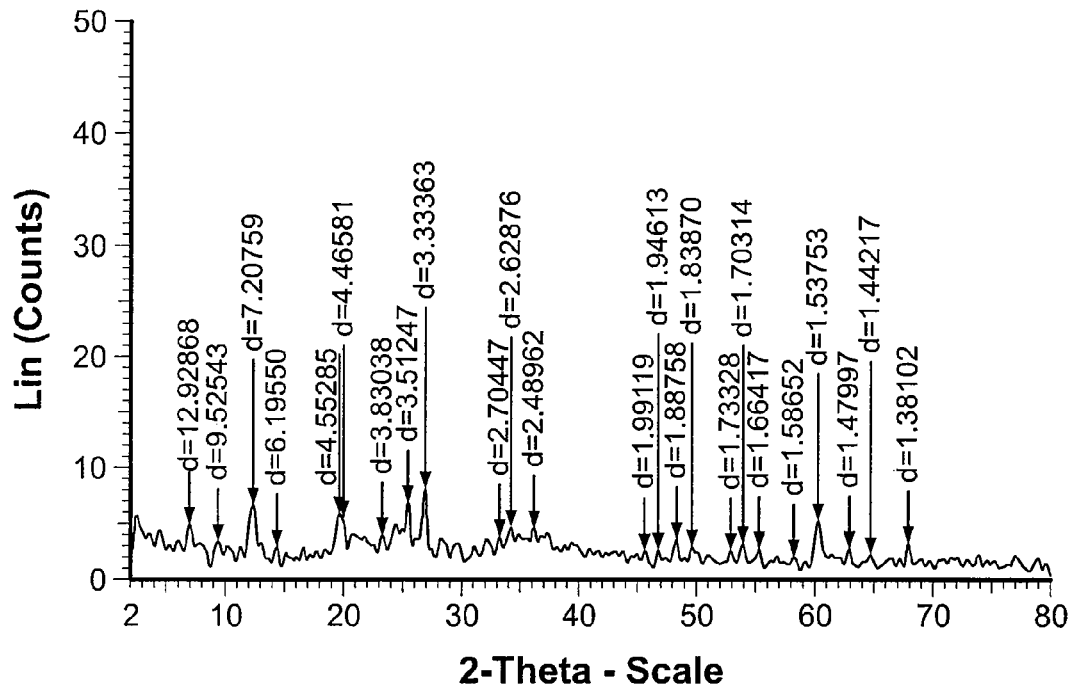
Figure 10:
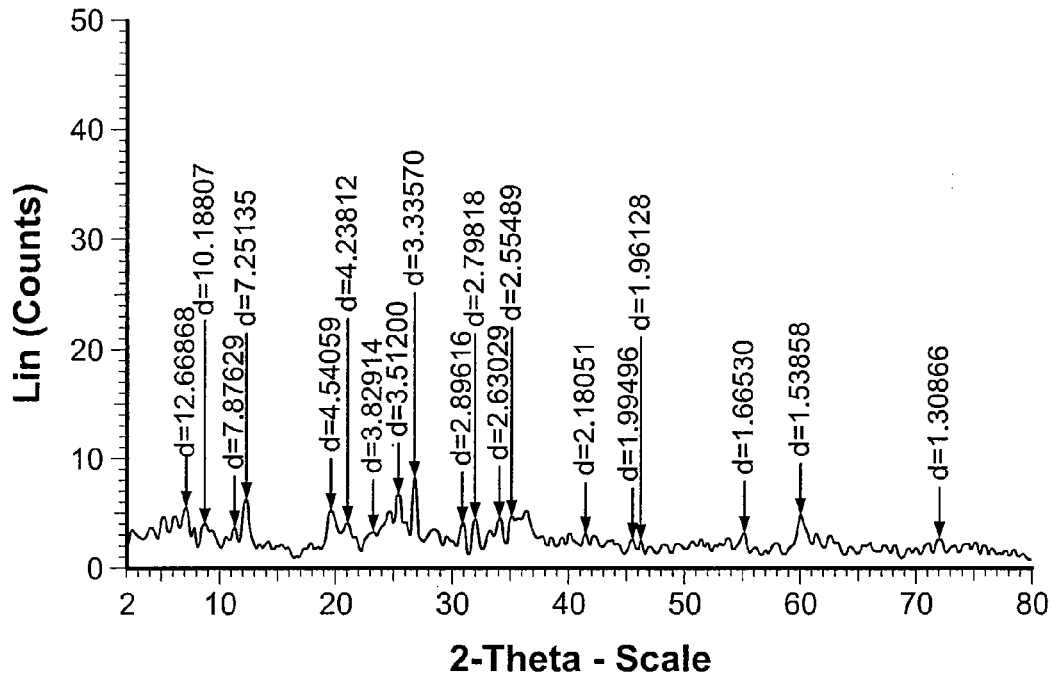
Figure 11:
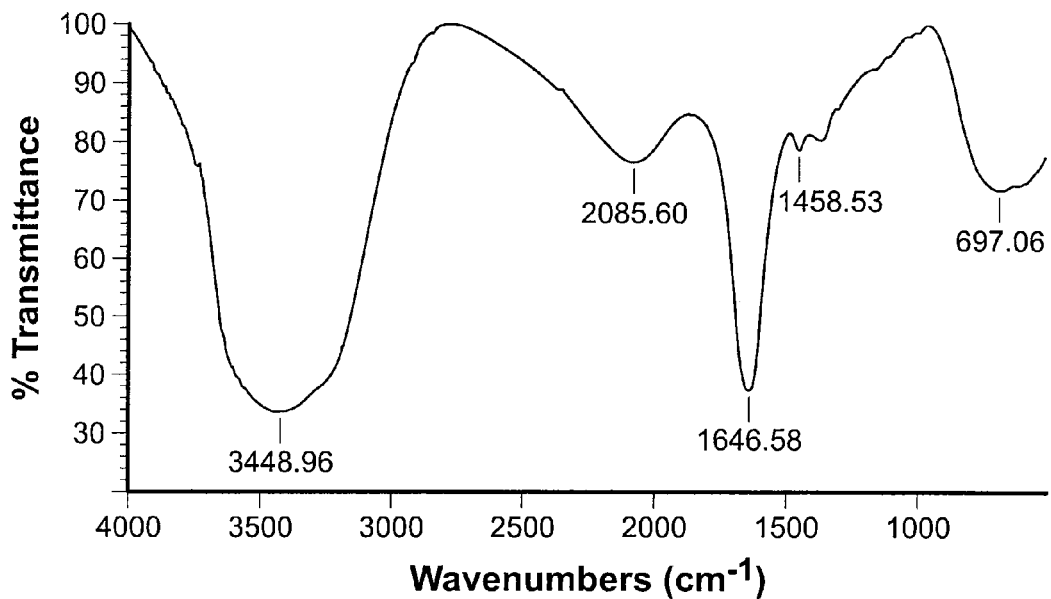
FIG. 11-14 relates to comparative FTIR analysis of Type 11 & 11a: Kimberlite 9:3/5% liquid (example-4), Type 12 & 12a: 9:3/K—Si liquid (example-9), Type 13 & 13a: 9:3 (3 parts are from the alkali extraction from lignite 1:4 residue liquid), Type 14 & 14a: Kimberlite+K—Si/liquid (example-7) (5 gm of kimberlite fertilizer/silica fertilizer mixed with 40 ml distill water and the mixture is stirred at 3000 rpm for 20-30 minutes, and the resultant solution (supernatant)) is taken for FTIR analysis).
Figure 11A:
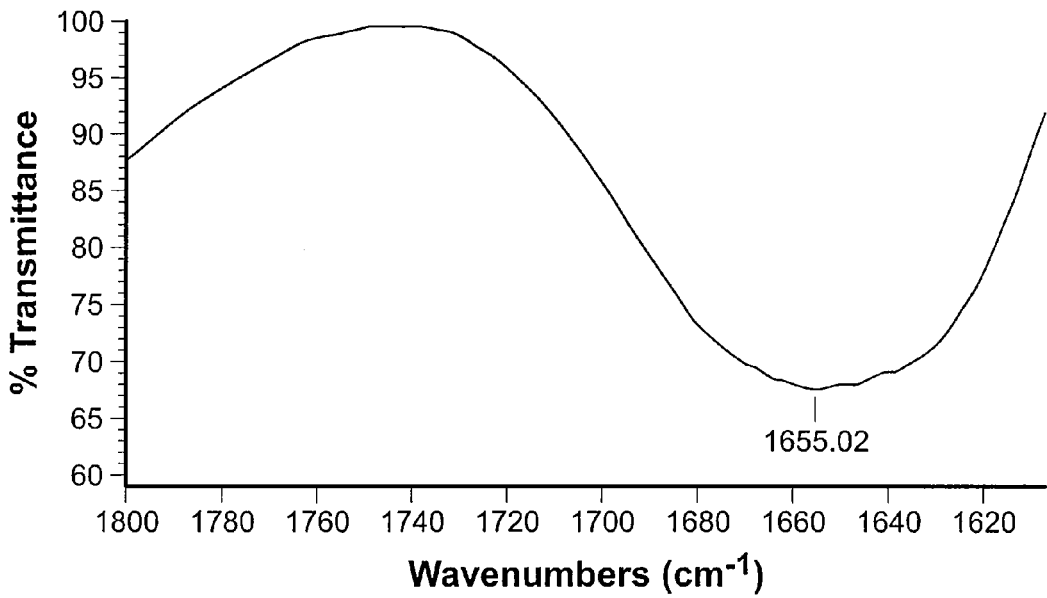
Figure 12:
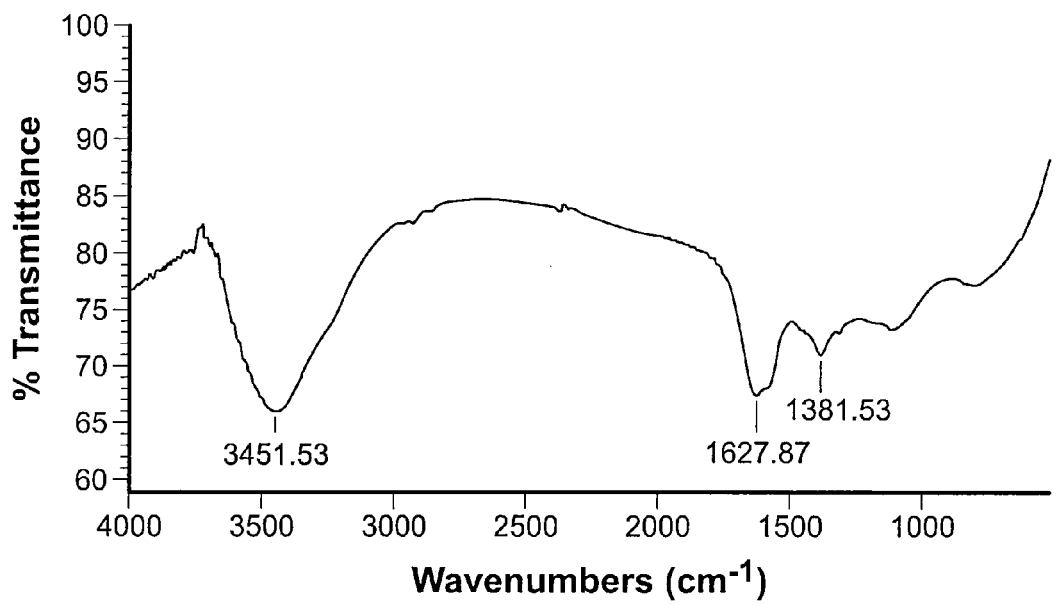
Figure 12A:
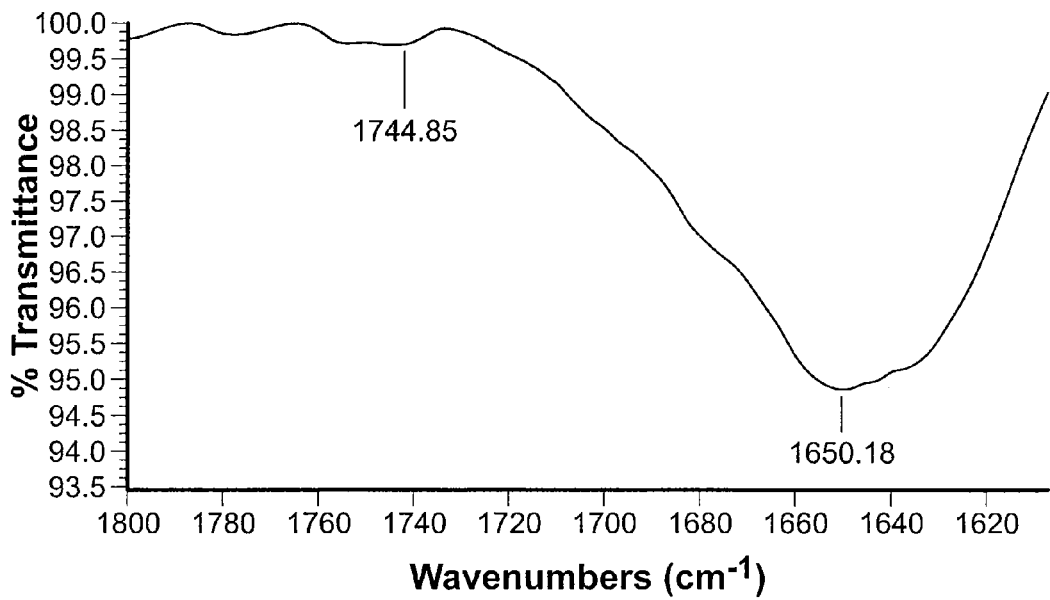
Figure 13:
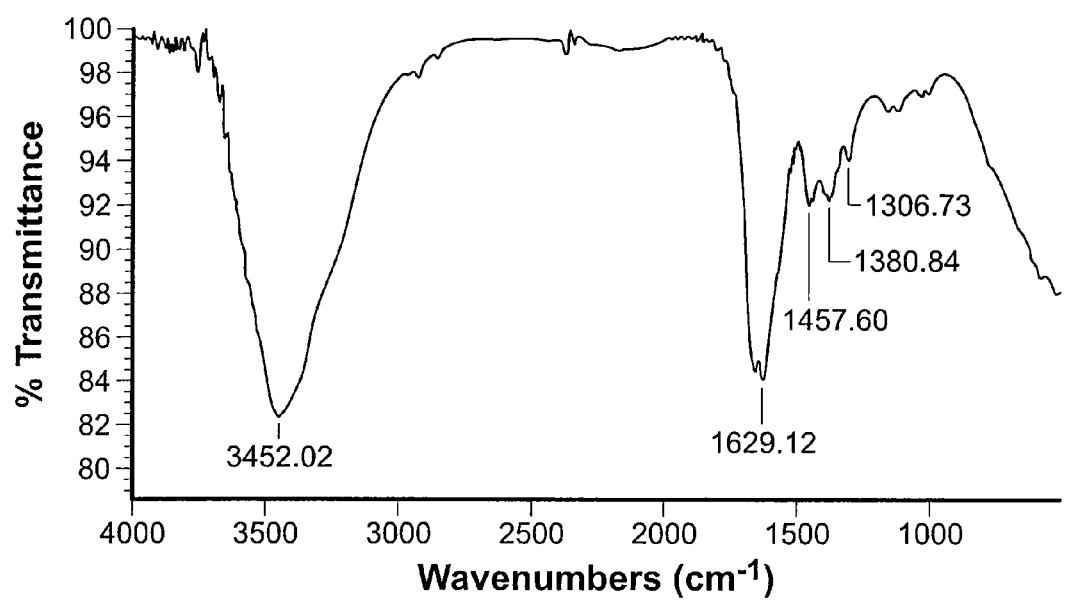
Figure 13A:
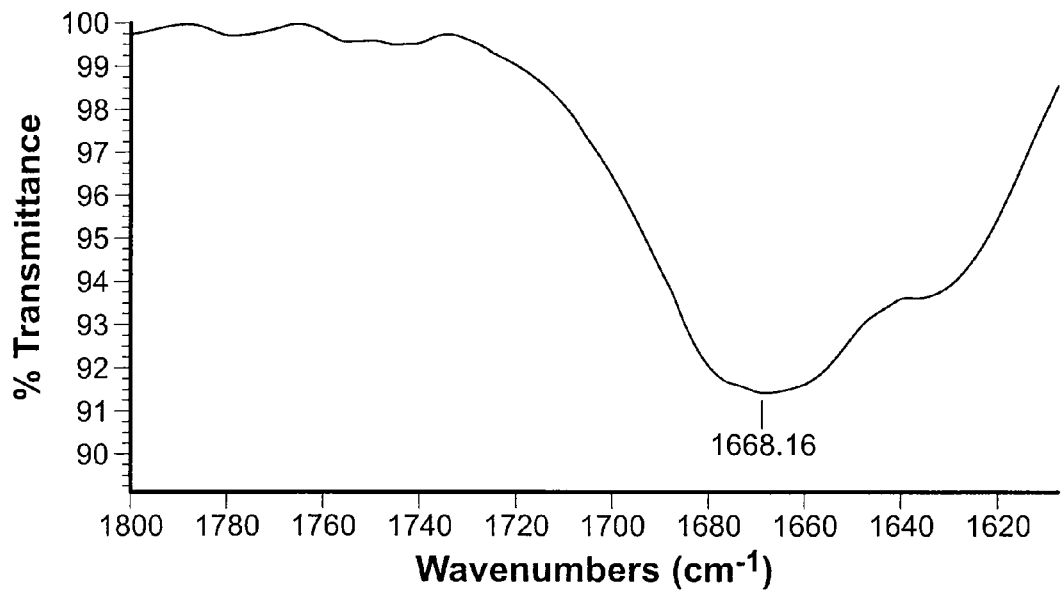
Figure 14:
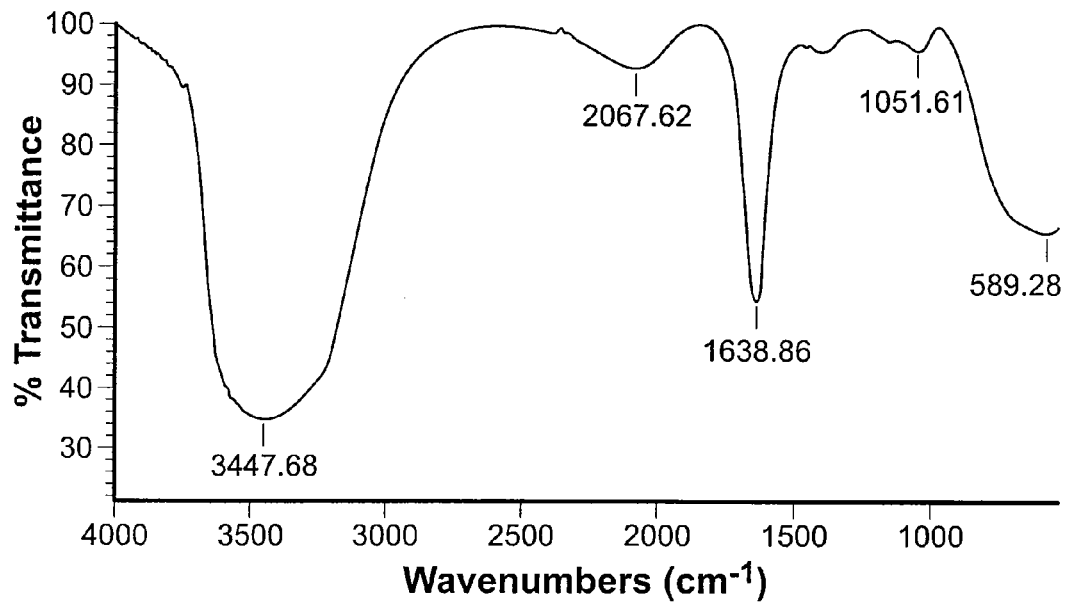
Figure 14A:
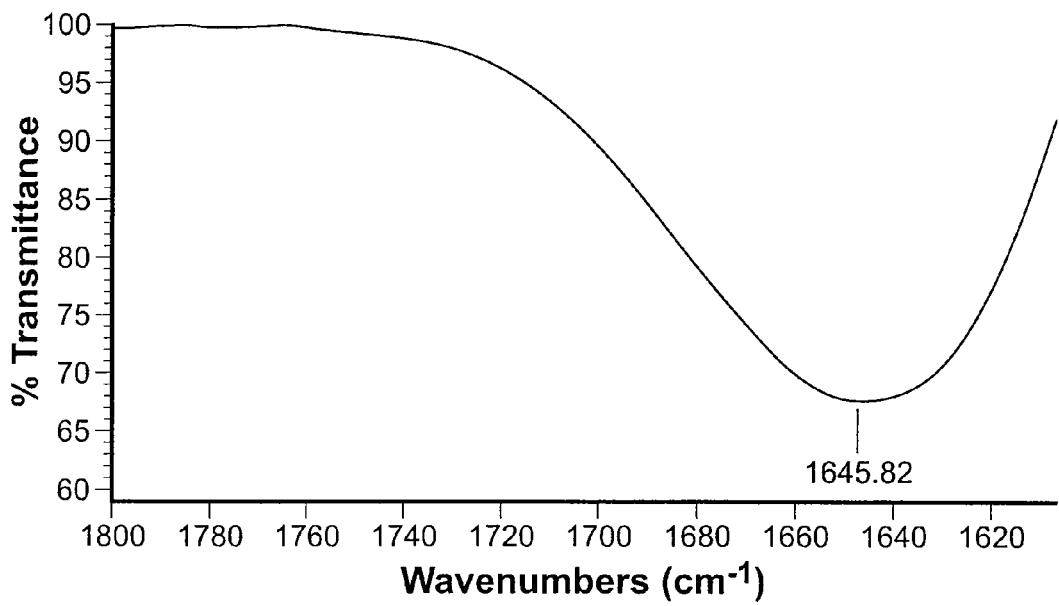

While the invention is susceptible to various modifications and alternative forms, specific aspects thereof has been shown by way of example in the illustrative examples and will be described in detail below. It should be understood, however that it is not intended to limit the invention to the particular forms disclosed, but on the contrary, the invention is to cover all modifications, equivalents, and alternative falling within the spirit and the scope of the invention as defined by the appended claims.

Before describing in detail embodiments it may be observed that the novelty and inventive step that are in accordance with the present invention resides in an efficient plant nutrient obtained from the kimberlite, whereby a first component comprising kimberlite with alkali metal silicate in the ratio of 10:1 to 1:10 w/v; and/or a second component comprising lignite with alkali metal silicate in the ratio of 10:1 to 1:10 w/v; wherein the ratio between the first and the second component is in the range of 10:1 to 1:10 on a weight by weight basis. It is to be noted that a person skilled in the art can be motivated from the present invention and modify application of the said nutrient from crop to crop. However, such modification should be construed within the scope and spirit of the invention. Accordingly, the examples are showing only those specific details that are pertinent to understanding the aspects of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a setup, device that comprises a list of components does not include only those components but may include other components not expressly listed or inherent to such setup or device. In other words, one or more elements in a plant nutrient or method proceeded by "comprises . . . a" does not, without more constraints, preclude the existence of other elements or additional elements in the composition or method. The following paragraphs explain present invention with respect to an efficient plant nutrient comprising kimberlite based plant nutrient, wherein the said plant nutrient with or without alkali solution is treated with alkali metal silicate for utilization as nutrient to supply silica, silica, magnesium, trace elements with or without organic substances, and also having scope to design products with various combinations with other fertilizers and/or plant based nutrients.

Accordingly, one aspect of the present invention relates to a plant nutrient composition comprising: a first component comprising kimberlite with alkali metal silicate in the ratio of 10:1 to 1:10 w/v; and/or a second component comprising lignite with alkali silicate in the ratio of 10:1 to 1:10 w/v; wherein the ratio between the first and the second component is in the range of 10:1 to 1:10 on a weight by weight basis.

Another aspect of the present invention wherein a plant nutrient composition comprising a first component comprising kimberlite with lignite in the ratio of 10:1 to 1:10 w/v; a second component comprising urea with alkali solution in the ratio of 10:1 to 1:10 w/v; wherein the ratio between the first and the second component is in the range of 10:1 to 1:10 on a weight by volume basis.

Yet another aspect of the present invention, wherein a plant nutrient composition comprising: a first component comprising nano size kimberlite with alkali metal silicate in the ratio of 10:1 to 1:10 w/v; and/or a second component comprising lignite with alkali metal silicate in the ratio of 10:1 to 1:10 w/v; wherein the ratio between the first and the second component is in the range of 10:1 to 1:10 on a weight by weight basis.

Yet another aspect of the present invention, wherein a plant nutrient composition comprising a first component comprising nano size kimberlite with lignite in the ratio of 10:1 to 1:10 w/v; a second component comprising urea with alkali solution in the ratio of 10:1 to 1:10 w/v; wherein the ratio between the first and the second component is in the range of 10:1 to 1:10 on a weight by volume basis.

Still another aspect of the present invention relates to a process for preparing the plant nutrient composition, said process comprising the steps:
a) subjecting kimberlite to a micronization process to obtain micronized kimberlite and adding alkali metal silicate to the micronized kimberlite in the ratio 10:1 to 1:10 to obtain a first component;
b) subjecting lignite to a micronization process to obtain micronized lignite and adding alkali metal silicate to the micronized lignite in the ratio 10:1 to 1:10 to obtain a second component;
c) mixing thoroughly the first component and second component in the range of 10:1 to 1:10 along with water in the range of 100 ml to 1000 ml and thus obtained slurry of the mixture,
d) drying the slurry thus obtained in step (c) to a palletizing or a powdering procedure to obtain the plant nutrient composition A further another aspect of the present invention, wherein a process for preparing the plant nutrient composition comprising the steps:
a) subjecting kimberlite and lignite to a micronization process to obtain micronized kimberlite and lignite, and mixing the micronized kimberlite and lignite in the ratio 10:1 to 1:10 to obtain a first component;
b) subjecting mixture of step (a) with urea and alkaline solution as a second component to obtain a reaction mixture;
c) adding water to the reaction mixture thus obtained in step (b) in the range of 100 ml to 1000 ml and mixing thoroughly the first component and second component in the range of 10:1 to 1:10 w/v, in order to obtain slurry of the mixture,
d) drying the slurry thus obtained in step (c) to a palletizing or a powdering procedure to obtain the-plant nutrient composition Yet another aspect of the present invention, wherein a process for preparing the plant nutrient composition as claimed in claim 3, said process comprising the steps:
a) subjecting kimberlite to a nano size process to obtain nano size kimberlite and adding alkali metal silicate to the nano size kimberlite in the ratio 10:1 to 1:10 to obtain a first component;
b) subjecting lignite to a nano size process to obtain nano size lignite and adding alkali metal silicate to the nano size lignite in the ratio 10:1 to 1:10 to obtain a second component;
c) mixing thoroughly the first component and second component in the range of 10:1 to 1:10 along with water in the range of 100 ml to 1000 ml and thus obtained slurry of the mixture,
d) drying the slurry thus obtained in step (c) to a palletizing or a powdering procedure to obtain the-plant nutrient composition Yet another aspect of the present invention, wherein a process for preparing the plant nutrient composition as claimed in claim 4, said process comprising the steps:
a) subjecting kimberlite and lignite to a nano size process to obtain nano size kimberlite and lignite, and mixing the nano size kimberlite and lignite in the ratio 10:1 to 1:10 to obtain a first component;
b) subjecting mixture of step (a) with urea and alkaline solution as a second component to obtain a reaction mixture;
c) adding water to the reaction mixture thus obtained in step (b) in the range of 100 ml to 1000 ml and mixing thoroughly the first component and second component in the range of 10:1 to 1:10 w/v, in order to obtain slurry of the mixture, d) drying the slurry thus obtained in step (c) to a palletizing or a powdering procedure to obtain the-plant nutrient composition Yet another aspect of the present invention, wherein the alkali metal silicate are sodium silicate, potassium silicate and mixture thereof.

Yet another aspect of the present invention, wherein the kimberlite based plant nutrient is use as at basel as a atop-dressing with or without other plant nutrients.

One of the aspects of the present invention relates to provide a nano structured kimberlite based plant nutrient that can be absorbed by plant roots more efficiently.

Yet another aspect of the present invention, wherein the Alkali (Sodium Hydroxide or Potassium Hydroxide or Ammonia etc.) to Kimberlite was added at a ratio of 1:3 to 1:50 (w/w). The mixture of alkali and kimberlite was blended by grinding properly, then water was added appropriately to mix thoroughly. The resultant material was mixed with alkali metal silicate for usage as the fertilizer.

Nitric Acid or Phosphoric Acid was added to Kimberlite (5 to 50% v/w) and later neutralizing with alkali (Sodium Hydroxide or Potassium Hydroxide or Ammonia etc.) was done.

The Kimberlite was mixed with alkali metal silicate and having utility as filler material with other fertilizers such as DAP and other single-direct and/or complex fertilizers of NPK.

Lignite was added to Kimberlite at a ratio of 10:1 to 1:10 and later alkali was added to the mixture of lignite and kimberlite at a ratio of 1:3 to 1:50 (w/w) along with urea in the ratio of 10:1 to 1:10. The resultant mixture of alkali, lignite-kimberlite and urea was blended by grinding properly, then water was added appropriately to mix thoroughly.

When kimberlite based fertilizer products were tested on various agricultural crops enhanced yields significantly. When silica supplementation has been done through these kimberlite based products, on crops, it imparted resistance to diseases apart from yield enhancement.

Present invention explains production of various types of Kimberlite based fertilizer products for enhancement of yield of various agricultural crops.

The results derived from embodiments of the present invention gives a scope of using Kimberlite based fertilizer products for effective and economic integrated fertilizer management.

This invention has been explained by way of few examples and is not restricted to various combinations and feasibilities of the basic aspect.

Now embodiments of the invention will be described in detail so as to illustrate and explain various salient features of the invention.

For the purpose of this desciption, kimberlite is basically obtained after removing of few carats of diamonds from tons of kimberlite. Hence, the inventors are utilizing in the experiments, the massive amount of kimberlite which has been accumulated after removal of diamonds, as a useful plant nutrient.

Example: 1-3

In order to prepare an efficient plant nutrient, 900 gm of kimberlite, 100 grams of lignite was added and mixed thoroughly. Urea and KOH were added to the above mixture (as shown in above table) and mixed thoroughly. Water was added to the mixture and mixed thoroughly to get brown color paste. Product was dried at 70-90° C. to remove moisture. The product was pulverized to get the powder of desired size.

Table 1 show the study of the various experimental trials for the preparation of the plant nutrient, wherein the kimberlite is added with lignite in 9:1 proportion with alkali hydroxide and urea.

TABLE 1

| Constituents | Ex-1 (V1) | Ex-2 (V2) | Ex-3 (V3) |
|---|---|---|---|
| Kimberlite | 900 g | 900 | 900 |
| Lignite | 100 g | 100 | 100 |
| KOH | 53 g (5%) | 112 (10%) | 250 (20%) |
| Urea | 55 g (5%) | 59 (5%) | 66 (5%) |
| Utilities Water | 350 ml | 300 ml | 170 ml |

In order to prepare an efficient plant nutrient, 900 gm of kimberlite, and 300 grams of lignite was added and mixed thoroughly. Urea and KOH were added to the above mixture (as shown in above table) and mixed thoroughly. Water was added to the mixture and mixed thoroughly to get brown color paste. Product was dried at 70-90° C. to remove moisture. The product was pulverized to get the powder of desired size.

Table 2 show the study of the various experimental trials for the preparation of the plant nutrient, wherein the kimberlite is added with lignite in 9:3 proportions with alkali hydroxide and urea.

This Product [V2] Resulted in Enhanced Yield More than 25% on Groundnut Crop and VI Product Resulted in 24% Enhanced Yield in Groundnut.

Preparation of Organic Silica Fertilizer 9:3

TABLE 2

| Reagents | Ex-4 (V1) | Ex-5 (V2) | Ex-6 (V3) |
|---|---|---|---|
| Kimberlite | 900 g | 900 | 900 |
| Lignite | 300 g | 300 | 300 |
| KOH | 63 g (5%) | 133 (10%) | 300 (20%) |
| Urea | 67 g (5%) | 70 (5%) | 79 (5%) |
| Utilities Water | 700 ml | 750 ml | 400 ml |

Example 7

To 900 gm of kimberlite, 300 ml of potassium silicate [20-24% silica/10-12% potassium] was added and mix thoroughly. Water was added to the mixture and mixed thoroughly. Product was dried at 70-90° C. to remove moisture. The product was pulverized to get the powder of desired size. This product resulted in enhanced yield more than 29% on rice crop.

Example 8

To 900 gm of lignite, 300 ml of potassium silicate [20-24% silica/10-12% potassium] was added and mix thoroughly. Water was added to the mixture and mixed thoroughly. Product was dried at 70-90° C. to remove moisture. The product was pulverized to get the powder of desired size. This product resulted in enhanced yield more than 15% on rice crop.

Example 9

To 900 gm of kimberlite, 300 ml of potassium silicate [20-24% silica/10-12% potassium] was added and mix thoroughly. [A]

To 300 gms of lignite powder, was added to 100 ml of Potassium Silicate and mix thoroughly [B]

To above two mixtures [A+B] after mixing, 1000 ml of water was added and mixed thoroughly to get brown color paste.

Product was dried at 70-90° C. to remove moisture. The product was pulverized to get the powder of desired size. This product resulted in enhanced yield more than 25% on rice crop.

Example 10

100 gms of soil was mixed with 50 ml of water and after mixing them well, 5 grams of nano structured kimberlite was added to the soil and thoroughly mixed. The nano size is 75 nm/100 nm/150 nm/200 nm/250 nm.

Whereas, in control 5 grams of natural kimberlite, without grinding (0.1 to 3 mm size) was added to 100 grams of soil with 50 ml of water and thoroughly mixed. After 24 hours the soluble silica content was estimated from these treated and controlled samples. It is found that nano structured kimberlite based plant nutrient has potential of releasing 70% more soluble silica into the soil system than compared to normal kimberlite or micron sized (0.1-3 mm size).

The product of examples 1 to 8 is converted into the nano size powder and kimberlite based fertilizer products were tested on various agricultural crops. Kimberlite based fertilizer is nano structured by physical grinding repeatedly and after grading by passing through various sizes of meshes and with final confirmation after microscopic examination.

It is found that yield of the crops increases significantly in the range of 5 to 25%, while using nano size kimberlite.

The embodiments described above and shown herein are illustrative and not restrictive. The scope of the invention is indicated by the claims rather than by the foregoing description and attached drawings. The invention may be embodied in other specific forms without departing from the spirit of the invention. Accordingly, these and any other changes which come within the scope of the claims are intended to be embraced therein.

I claim:

1. A plant nutrient composition comprising a first component comprising kimberlite with alkali metal silicate in the ratio of 10:1 to 1:10 w/v; and a second component comprising lignite with alkali metal silicate in the ratio of 10:1 to 1:10 w/v; wherein the ratio between the first and the second components is in the range of 10:1 to 1:10 on a weight by weight basis.

2. A plant nutrient composition comprising a first component comprising kimberlite with lignite in the ratio of 10:1 to 1:10 w/v; and a second component comprising urea with alkali solution in the ratio of 10:1 to 1:10 w/v; wherein the ratio between the first and the second components is in the range of 10:1 to 1:10 on a weight by volume basis.

3. A plant nutrient composition comprising a first component comprising nano size kimberlite with alkali metal silicate in the ratio of 10:1 to 1:10 w/v; and a second component comprising nano size lignite with alkali metal silicate in the ratio of 10:1 to 1:10 w/v; wherein the ratio between the first and the second components is in the range of 10:1 to 1:10 on a weight by weight basis.

4. A plant nutrient composition comprising a first component comprising nano size kimberlite with lignite in the ratio of 10:1 to 1:10 w/v; and a second component comprising urea with alkali solution in the ratio of 10:1 to 1:10 w/v; wherein the ratio between the first and the second components is in the range of 10:1 to 1:10 on a weight by volume basis.

5. A process for preparing the plant nutrient composition as claimed in claim 1, said process comprising the steps:
   a) subjecting kimberlite to a micronization process to obtain micronized kimberlite and adding alkali metal silicate to the micronized kimberlite in the ratio 10:1 to 1:10 to obtain a first component;
   b) subjecting lignite to a micronization process to obtain micronized lignite and adding alkali metal silicate to the micronized lignite in the ratio 10:1 to 1:10 to obtain a second component;
   c) mixing thoroughly the first component and second component in the range of 10:1 to 1:10 along with water to obtain a slurry of the mixture; and
   d) drying the slurry thus obtained in step (c) to a pelletizing or a powdering procedure to obtain the plant nutrient composition.

6. A process for preparing the plant nutrient composition as claimed in claim 2, said process comprising the steps:
   a) subjecting kimberlite and lignite to a micronization process to obtain micronized kimberlite and lignite, and mixing the micronized kimberlite and lignite in the ratio 10:1 to 1:10 to obtain a first component;
   b) subjecting mixture of step (a) with urea and alkaline solution as a second component to obtain a reaction mixture;
   c) adding water to the reaction mixture thus obtained in step (b) and mixing thoroughly the first component and second component in the range of 10:1 to 1:10 w/v, in order to obtain slurry of the mixture; and
   d) drying the slurry thus obtained in step (c) to a pelletizing or a powdering procedure to obtain the plant nutrient composition.

7. A process for preparing the plant nutrient composition as claimed in claim 3, said process comprising the steps:
   a) subjecting kimberlite to a nano size process to obtain nano size kimberlite and adding alkali metal silicate to the nano size kimberlite in the ratio 10:1 to 1:10 to obtain a first component;
   b) subjecting lignite to a nano size process to obtain nano size lignite and adding alkali metal silicate to the nano size lignite in the ratio 10:1 to 1:10 to obtain a second component;
   c) mixing thoroughly the first component and second component in the range of 10:1 to 1:10 along with water to obtain a slurry of the mixture; and
   d) drying the slurry thus obtained in step (c) to a pelletizing or a powdering procedure to obtain the plant nutrient composition.

8. A process for preparing the plant nutrient composition as claimed in claim 4, said process comprising the steps:
   a) subjecting kimberlite and lignite to a nano size process to obtain nano size kimberlite and lignite, and mixing the nano size kimberlite and lignite in the ratio 10:1 to 1:10 to obtain a first component;
   b) subjecting mixture of step (a) with urea and alkaline solution as a second component to obtain a reaction mixture;
   c) adding water to the reaction mixture thus obtained in step (b) and mixing thoroughly the first component and second component in the range of 10:1 to 1:10 w/v, in order to obtain slurry of the mixture; and d) drying the slurry thus obtained in step (c) to a pelletizing or a powdering procedure to obtain the plant nutrient composition.

9. The plant nutrient composition as claimed in claim 1, wherein the alkali metal silicate is selected from the group consisting of potassium silicate, sodium silicate, and a mixture thereof.

10. The method for using the plant nutrient composition of claim 1, comprising a step of: applying the plant nutrient composition of claim 1 as a topdressing.

11. The method for using the plant nutrient composition of claim 1, comprising a step of: applying the plant nutrient composition of claim 1 as a basal application.

12. The method for using the plant nutrient composition of claim 2, comprising a step of: applying the plant nutrient composition of claim 2 as a topdressing.

13. The method for using the plant nutrient composition of claim 2, comprising a step of: applying the plant nutrient composition of claim 2 as a basal application.

14. The plant nutrient composition as claimed in claim 3, wherein the alkali metal silicate is selected from the group consisting of potassium silicate, sodium silicate, and a mixture thereof.

* * * * *